(12) United States Patent
Wildhagen

(10) Patent No.: US 7,221,925 B2
(45) Date of Patent: May 22, 2007

(54) BROADCAST RECEIVER WITH ANTENNA/FREQUENCY DIVERSITY

(75) Inventor: Jens Wildhagen, Weinstadt (DE)

(73) Assignee: Sony Deutschland GmbH, Cologne (DE)

( * ) Notice: Subject to any disclaimer, the term of this patent is extended or adjusted under 35 U.S.C. 154(b) by 195 days.

(21) Appl. No.: 10/145,164

(22) Filed: May 13, 2002

(65) Prior Publication Data

US 2002/0168955 A1 Nov. 14, 2002

(30) Foreign Application Priority Data

May 14, 2001 (EP) .................................. 01111673

(51) Int. Cl.
*H04B 1/10* (2006.01)
(52) U.S. Cl. .................. 455/312; 455/137; 455/278.1; 375/347
(58) Field of Classification Search ................ 455/312, 455/133, 134, 135, 137, 140, 272, 273, 276.1, 455/277.2, 277.1, 278.1, 296; 375/347, 279, 375/267
See application file for complete search history.

(56) References Cited

U.S. PATENT DOCUMENTS

| 4,742,563 | A | * | 5/1988 | Fukumura | 455/132 |
|---|---|---|---|---|---|
| 4,752,969 | A | * | 6/1988 | Rilling | 455/278.1 |
| 4,850,037 | A | | 7/1989 | Bochmann | 455/276.1 |
| 5,297,168 | A | | 3/1994 | Sant' Agostino et al. | 375/347 |
| 5,345,602 | A | * | 9/1994 | Wiedemann et al. | 455/137 |
| 5,710,995 | A | * | 1/1998 | Akaiwa et al. | 455/277.2 |
| 5,838,742 | A | * | 11/1998 | Abu-Dayya | 375/347 |
| 6,097,773 | A | * | 8/2000 | Carter et al. | 375/347 |
| 6,141,536 | A | * | 10/2000 | Cvetkovic et al. | 455/45 |
| 6,167,243 | A | * | 12/2000 | Wang et al. | 455/137 |
| 6,178,316 | B1 | * | 1/2001 | Dinnan et al. | 455/296 |
| 6,178,317 | B1 | * | 1/2001 | Kroeger et al. | 455/296 |
| 6,236,844 | B1 | * | 5/2001 | Cvetkovic et al. | 455/273 |
| 2002/0141520 | A1 | * | 10/2002 | Nigrin et al. | 375/347 |

FOREIGN PATENT DOCUMENTS

| EP | 0 967 738 | | 12/1999 |
|---|---|---|---|
| GB | 002257605 A | * | 1/1993 |
| GB | 2257605 A | * | 1/1993 |
| GB | 2 257 605 A | * | 1/1999 |

* cited by examiner

*Primary Examiner*—Edward F. Urban
*Assistant Examiner*—Blane J. Jackson
(74) *Attorney, Agent, or Firm*—Oblon, Spivak, McClelland, Maier & Neustadt, P.C.

(57) ABSTRACT

Noise and multipath distortions in a broadcast receiver are reduced by an optimal antenna/frequency diversity concept in which the distortions in the audio signal are evaluated to choose a different antenna and/or a different frequency for at least signal parts.

13 Claims, 1 Drawing Sheet

BROADCAST RECEIVER WITH ANTENNA/FREQUENCY DIVERSITY

DESCRIPTION

Figure 1:
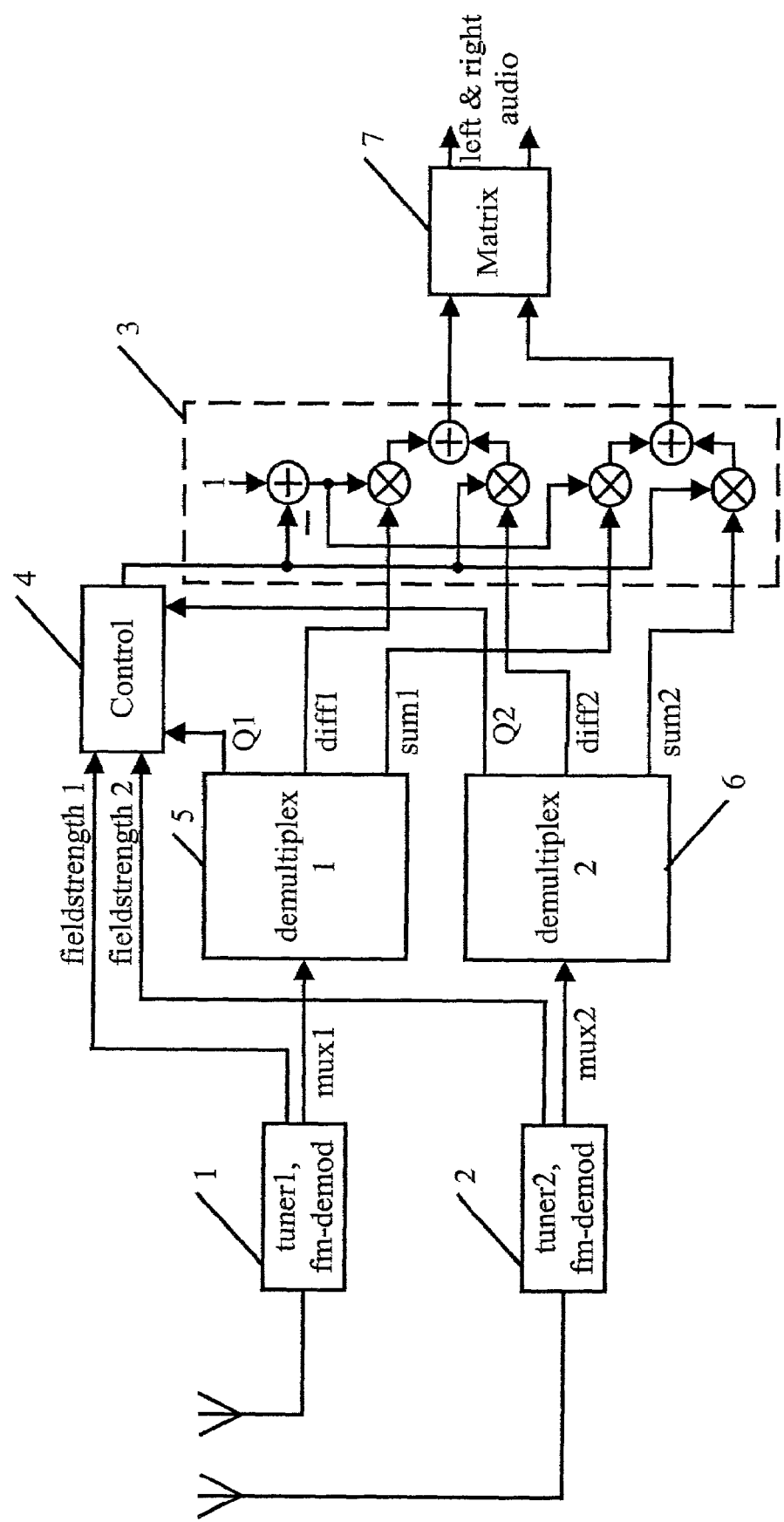

The present invention relates to a broadcast receiver, in particular to a broadcast receiver working according to the antenna/frequency diversity concept.

Antenna and/or frequency diversity concepts are realized for a reduction of noise and multipath distortions in an audio signal corresponding to a received broadcast signal. Today's antenna diversity concepts usually combine the received signals of two antennas before the frequency demodulation is performed. This is usually done by using diodes. To gain a good signal-to-noise ratio the received signal with the stronger amplitude is then input to the frequency demodulator.

Therefore, according to today's antenna diversity concepts the noise or distortions included in the audio signal are not minimized, but the audio signal is calculated from the antenna with the stronger fieldstrength. Based thereon, it is the object underlying the present invention to provide a broadcast receiver which enhances the reduction of noise and multipath distortions in the audio signal and a corresponding method to process a received broadcast signal.

A broadcast receiver according to the present invention is defined in independent claim 1 and a method to process a received broadcast signal according to the present invention is defined in independent claim 8. Preferred embodiments thereof are respectively defined in the respective following subclaims. A computer program product embodying the method according to the present invention is defined in claim 15.

A broadcast receiver according to the present invention comprises additionally to the demodulator normally included in a broadcast receiver at least one second demodulator to independently demodulate the received broadcast signal, a weighting unit to weight the output signals of the demodulators or signals derived therefrom according to a variable weighting signal and to generate a weighted sum signal thereof for the further processing of the received broadcast signal, and a control unit to generate the weighting signal on basis of the output signals of the demodulators, and/or of quality indication signals derived therefrom, and/or of fieldstrengths corresponding to the output signals of the first and respective second demodulators and/or of quality indication signals derived therefrom.

Therefore, according to the present invention, the noise and distortions included in the demodulated broadcast signal are taken into account and a sliding transition between all received broadcast signals or signals derived therefrom is performed to achieve an improved signal-to-noise ratio (SNR).

According to the present invention preferably said first and respective second demodulators receive signals from a first and respective second antenna to demodulate the received broadcast signal of the same frequency to realize an antenna diversity concept. Also, signals of different frequencies might be received from the different antennas.

Alternatively or additionally, according to the present invention said first and respective second demodulators might receive signals from the same antenna to demodulate the received broadcast signal of different frequencies to realize a frequency diversity system or an antenna and frequency diversity system.

Therefore, according to the preferred embodiments of the present invention the audio signal of at least two different antennas and/or at least two different frequencies are demodulated. The noise and distortion content is compared in all demodulated audio signals to perform a different weighting of these signals. Based on such a sliding transition between all received audio signals or signals derived therefrom the antenna and/or frequency diversity concept has a gain in SNR compared to the state of the art antenna/frequency diversity concepts, even in case none of the antennas/frequencies contains distortions.

For example, the antenna diversity concept according to the present invention realized with two antennas has a gain in SNR of 3 dB compared to the state of the art antenna diversity concept in case none of the antennas contains distortions. The frequency diversity system according to the present invention alone is able to reduce multipath distortions with only one antenna.

The weighting of the demodulated broadcast signal or signals derived there from is based on the noise and/or distortion content of all received and demodulated broadcast signals. The weighting signals might be generated on basis of a comparison of the demodulated broadcast signals and/or on basis of a more sophisticated calculation, such as a calculation of the coherent demodulated in quadrature component of a demodulated broadcast signal or a signal derived therefrom and/or on basis of a determination of the out of band noise of such a signal. Also in the latter cases a comparison of the derived signals or signals derived therefrom could be used to determine the weighting signal. Further alternatively or additionally, the fieldstrength of the received and demodulated signal could be used to determine the weighting signal.

In case the present invention is used in a fm stereo broadcast receiver preferably a first demultiplexer receives the output signal of the first demodulator and generates a first quality indication signal to be input to the control unit, a first stereo difference signal to be input to the weighting unit and a first stereo sum signal to be input to the weighting unit, a respective second demultiplexer receiving the output signal of the respective second demodulator and generating a respective second quality indication signal to be input to the control unit, a respective second stereo difference signal to be input to the weighting unit, a respective second stereo sum signal to be input to the weighting unit, and a matrix circuit receiving a weighted sum of the first and respective second stereo difference signal and a weighted sum of the first and respective second stereo sum signal generated by the weighting unit to generate left and right audio signals.

Further features and advantages of the broadcast receiver and method to process a received broadcast signal according to the present invention as well as the computer program product embodying the method according to the present invention will become apparent from the following detained description of an exemplary embodiment thereof taken in conjunction with the accompanying only FIG. 1 which shows a fm stereo broadcast receiver with antenna and/or frequency diversity according to the present invention.

The RF signal of two different antennas 8, 9 and/or two different frequencies are demodulated separately in a respective first tuner, i.e. fm-demodulator, 1 and a respective second tuner, i.e. fm-demodulator, 2. The first multiplex signal mux1 output by the first tuner 1 is input to a first demultiplexer 5 to be split into a first sum signal sum1 and a first difference signal diff1, and to generate a first quality indication signal Q1. The second multiplex signal mux2 output by the second tuner 2 is input to a second demultiplexer 6 to be split into a second sum signal sum2 and a second difference signal diff2, and to generate a second quality indication signal Q2.

The first and second sum and difference signals sum1, sum2, diff1, diff2 of both demultiplexers 5, 6 are multiplied with a variable weight before they are combined to one weighted sum signal and one weighted difference signal in a weighting unit 3. The combined weighted sum and difference signals are input to a matrix circuit 7 to calculate the left and right audio signals. The combined weighted sum and difference signals are processed like a state of the art demodulated and demultiplexed signal, i.e. a denoising and/or optimal demodulation can be performed before and/or after the matrix circuit 7.

The variable weight of both demultiplexed audio signals sum1, diff1, sum2, diff2 is calculated in a control circuit 4 based on the noise and/or distortions included in the respective audio signals. The noise and/or distortions included in the respective audio signal are preferably calculated from the coherent demodulated in quadrature component of the double sideband modulated difference signal (which in this case corresponds to the respective quality indication signal Q1, Q2). Of course, also other information like the fieldstrength of the demodulated signal and/or the out of band noise, i.e. the noise included in the multiplex signal as frequency above 60 kHz, can be used alone or in combination with the noise and/or distortions included in the respective audio signal for the calculation of the weights of both audio signals.

In FIG. 1 the additional usage of the fieldstrength is indicated in that each tuner outputs a fieldstrength indication signal to the control circuit 4, i.e. the first tuner 1 outputs a first fieldstrength indication signal fieldstrength 1 which is input to the control unit 4 and the second tuner 2 outputs a second fieldstrength indication signal fieldstrength 2 which is input to the control unit 4. As mentioned above, these fieldstrength indication signals which indicate the fieldstrength of the received and demodulated signal (not the signal at the antenna) could also be used alone to determine the variable weight.

In case both audio signals contain the same amount of distortions and/or the same fieldstrength, both audio signals are weighted with the same weight. In this case, the combined audio signal contains 3 dB less noise power compared to a state of the art fm-receiver. Depending on the distortions of both audio signals, the performance gain is less than 3 dB compared to the undisturbed state of the art receiver.

Since the inventive concept is independent from the RF signal it is possible to combine the audio signals of two different frequencies. Usually, a fm-program is transmitted via several different frequencies, because a single frequency network is not possible in fm-broadcast. Therefore, the same program can be received via different frequencies at the same time and at the same place. In case the receiver is close to a transmitter, the fieldstrength is strong and distortions in the audio signals are rare. In the area between two transmitters, the RF signal of both transmitters is low and distortions of the audio signal are likely. In this case, an antenna and/or a frequency diversity results in a strong reduction of distortions in the audio signal. Even with only one antenna a frequency diversity reduces the multipath distortions, since these are frequency selective. So, usually at one place, the frequency demodulated audio signal of one frequency is strongly disturbed, but the frequency demodulated audio signal of the alternative frequency contains only few distortions. Therefore, according to the invention multipath distortions might be reduced even in a fm-receiver with only one antenna. This is especially important for receivers that do not allow to install a second antenna, like portable fm-receivers or after market car receivers (in cars with only one antenna).

Of course, the present invention is not limited to only one second tuner and demultiplexer, but further second tuners and demultiplexers (and antennas) might be included to further increase the gain in SNR.

The weighting unit 3 comprises a respective multiplier for each of the incoming signals to be weighted and a respective adder for each of the respective weighted signals of the same kind, i.e. a respective multiplier for each of the demultiplexed signals diff1, sum1, diff2, sum2 and a respective adder for the pairs of demultiplexed signals of the same kind diff1, diff2 and sum1, sum2. In the shown circuit which comprises two demultiplexers the weighting signal generated by the control circuit 4 is directly input to the multipliers for the demultiplexed output signals of one demultiplexer, here of the second demultiplexer 6, and a signal corresponding to "1–weighting signal" is input to the multipliers in the signal path of the demultiplexed output signals of the other demultiplexer, here of the first demultiplexer 5. Therefore, the output signals of the weighting unit are generated according to the following formula: output signals of the second demultiplexer·weighting signal+output signals of the first demultiplexer·(1–weighting signal).

As is apparent from the foregoing description, the weighting unit 3 could also be arranged in the signal flow directly after the respective tuners or after the matrix circuit 7. In the latter case one matrix circuit would have to be provided after each demultiplexer and the weighting circuit would weight the respective output signals of these weighting circuits.

Therewith, according to the present invention noise and multipath distortions in a broadcast receiver are reduced by an optimal antenna/frequency diversity concept in which the distortions in the audio signal are evaluated to choose a different antenna and/or a different frequency.

The main advantageous differences between a broadcast receiver designed and/or working according to the present invention and a state of the art broadcast receiver are that an optimal antenna diversity depending on the distortions included in the audio signal is performed instead of the fieldstrength antenna diversity which results in an increased performance in every reception situation according to the present invention, a performance gain of at least 3 dB compared to a state of the art fm-receiver (with one or two antennas), and that the frequency diversity allows a reduction of noise and multipath distortions with only one antenna.

The invention claimed is:

1. A broadcast receiver, comprising:
   a first FM demodulator configured to demodulate a received broadcast signal and to generate a first output signal;
   at least one second FM demodulator configured to demodulate the received broadcast signal and to generate a respective second output signal;
   a weighting unit configured to weight the output signals of the first and respective second FM demodulators or signals derived therefrom according to a variable weighting signal and to generate a weighted sum signal thereof for the further processing of the received broadcast signal;
   a control unit configured to generate the weighting signal on basis of the output signals of the first and respective second FM demodulators, or of quality indication signals derived therefrom, or of field strengths corresponding to the output signals of the first and respective second FM demodulators or of quality indication signals derived therefrom; and a respective calculation unit for each one of the first and respective second output signals receiving one said first and respective second output signals or a signal derived therefrom to generate a respective quality indication signal by calculating a quadrature component coherent demodulator thereof, wherein the weighting signal is calculated based on the noise and/or distortions included in the output signals of the first and respective second FM demodulators.

2. The broadcast receiver according to claim 1, wherein said first and respective second FM demodulators receive signals from a first and respective second antennas to demodulate the received broadcast signal of the same frequency or of different frequencies.

3. The broadcast receiver according to claim 1, wherein said first and respective second FM demodulators receive signals from the same antenna to demodulate the received broadcast signal of different frequencies.

4. The broadcast receiver according to claim 1, further comprising:

a respective determination unit for each one of the first and respective second output signals receiving one said first and respective second output signals or a signal derived therefrom to generate a respective quality indication signal by determining the out of band noise thereof.

5. The broadcast receiver according to claim 1, further comprising:

a respective fieldstrength determination unit for each one of the first and respective second output signals receiving one said first and respective second output signals or a signal derived therefrom to generate a respective quality indication signal by determining the fieldstrength thereof.

6. A broadcast receiver comprising:

a first FM demodulator configured to demodulate a received broadcast signal and to generate a first output signal;

at least one second FM demodulator configured to demodulate the received broadcast signal and to generate a respective second output signal;

a weighting unit configured to weight the output signals of the first and respective second FM demodulators or signals derived therefrom according to a variable weighting signal and to generate a weighted sum signal thereof for the further processing of the received broadcast signal;

a control unit configured to generate the weighting signal on basis of the output signals of the first and respective second FM demodulators, or of quality indication signals derived therefrom, or of field strengths corresponding to the output signals of the first and respective second FM demodulators or of quality indication signals derived therefrom;

a first demultiplexer receiving the output signal of the first FM demodulator and generating a first quality indication signal to be input to the control unit, a first stereo difference signal to be input to the weighting unit and a first stereo sum signal to be input to the weighting unit;

a respective second demultiplexer receiving the output signal of the respective second FM demodulator and generating a respective second quality indication signal to be input to the control unit a respective second stereo difference signal to be input to the weighting unit and a respective second stereo sum signal to be input to the weighting unit; and a matrix circuit receiving a weighted sum of the first and respective second stereo difference signals and a weighted sum of the first and respective second stereo sum signals generated by the weighting unit to generate left and right audio signals, wherein the weighting signal is calculated based on the noise and/or distortions included in the output signals of the first and respective second FM demodulators.

7. A method to process a received broadcast signal, comprising:

FM demodulating the received broadcast signal with a first demodulator to generate a first output signal;

FM demodulating the received broadcast signal with a second demodulator to generate a respective second output signal;

weighting the first and respective second output signals or signals derived therefrom according to a variable weighting signal to generate a weighted sum signal thereof for the further processing of the received broadcast signal;

generating the weighting signal on basis of the first and respective second output signals, or of quality indication signals derived therefrom or of field strengths corresponding to the output signals of the first and respective second demodulators and/or of quality indication signals derived therefrom; and generating a respective quality indication signal for each one of the first and respective second output signals by calculating a quadrature component coherent demodulator thereof of said respective signal or a signal derived therefrom, wherein the weighting signal is calculated based on the noise and/or distortions included in the output signals of the first and respective second demodulators.

8. The method according to claim 7, further comprising:

receiving signals from a first and respective second antennas to FM demodulate the received broadcast signal of the same frequency or of different frequencies.

9. The method according to claim 7, further comprising:

receiving signals from the same antenna to FM demodulate the received broadcast signal of different frequencies.

10. The method according to claim 7, further comprising:

generating a respective quality indication for each one of the first and respective second output signals signal by determining the out of band noise of said respective signal or a signal derived therefrom.

11. The method according to claim 7, further comprising:

generating a respective quality indication for each one of the first and respective second output signals signal by determining the fieldstrength of said respective signal or a signal derived therefrom.

12. A method to process a received broadcast signal, comprising:

with a first demodulator to generate a first output signal;

FM demodulating the received broadcast signal with a second demodulator to generate a respective second output signal;

weighting the first and respective second output signals or signals derived therefrom according to a variable weighting signal to generate a weighted sum signal thereof for the further processing of the received broadcast signal;

generating the weighting signal on basis of the first and respective second output signals, or of quality indication signals derived therefrom, or of field strengths corresponding to the output signals of the first and respective second demodulators and/or of quality indication signals derived therefrom;

demultiplexing the first output signal and generating a first quality indication signal, a first stereo difference signal and a first stereo sum signal;

respectively demultiplexing a second output signal and generating a respective second quality indication signal, a respective second stereo difference signal and a respective second stereo sum signal; and generating left and right audio signals on basis of a weighted sum of the first and respective second stereo difference signals and a weighted sum of the first and respective second stereo sum signals, wherein the weighting signal is calculated based on the noise and/or distortions included in the output signals of the first and respective second demodulators.

13. A computer-readable recording medium having recorded thereon a program executable by a processor for performing a method to process a received broadcast signal, comprising:

FM demodulating the received broadcast signal with a first demodulator to generate a first output signal FM demodulating the received broadcast signal with a second demodulator to generate a respective second output signal;

weighting the first and respective second output signals or signals derived therefrom according to a variable weighting signal to generate a weighted sum signal thereof for the further processing of the received broadcast signal;

generating the weighting signal on basis of the first and respective second output signals, or of quality indication signals derived therefrom, or of field strengths corresponding to the output signals of the first and respective second demodulators or of quality indication signals derived therefrom;

calculating for each one of the first and respective second output signals, based on the received one said first and respective second output signals or a signal derived therefrom, a respective quality indication signal by calculating a quadrature component coherent demodulator thereof, wherein the weighting signal is calculated based on the noise and/or distortions included in the output signals of the first and respective second demodulators.

* * * * *